United States Patent [19]

Dakin et al.

[11] Patent Number: 4,897,542

[45] Date of Patent: Jan. 30, 1990

[54] OPTICAL PRESSURE SENSOR

[75] Inventors: John P. Dakin; Philip B. Withers, both of Hampshire, England

[73] Assignee: Plessey Overseas Limited, Ilford, United Kingdom

[21] Appl. No.: 174,734

[22] Filed: Mar. 29, 1988

[30] Foreign Application Priority Data

Mar. 31, 1987 [GB] United Kingdom ................. 8707616

[51] Int. Cl.⁴ ............................. G01L 1/00; H01J 5/16
[52] U.S. Cl. ................................. 250/227; 250/231 P
[58] Field of Search ............... 250/227, 231 R, 231 P; 356/352, 345, 35.5; 73/705, 800

[56] References Cited

U.S. PATENT DOCUMENTS 4,703,175 10/1987 Salour et al. ..................... 250/227
4,755,668 7/1988 Davis .............................. 250/227

Primary Examiner—Edward P. Westin
Attorney, Agent, or Firm—Fleit, Jacobson, Cohn, Price, Holman & Stern

[57] ABSTRACT

A Fabry-Perot pressure or displacement sensor comprises an optical fibre which serves to transmit a light beam to the mirrors of the sensor and to receive light which is reflected back from the mirrors. The light beam and the reflected light comprise light at a plurality of wavelengths. The wavelength components of the transmitted light and the wavelength components of the received light are range rated in range gates and are compared in comparators to provide respective ratios of transmitted intensities and received intensities. These ratios are in turn compared in comparator to provide a ratio dependent upon the displacement of the mirrors of sensor due to pressure applied thereto but independent of any changes in the intensities of transmitted light due to reflections from optical components in the pressure or displacement monitoring arrangement.

5 Claims, 2 Drawing Sheets

FIG. I.

OPTICAL PRESSURE SENSOR

This invention relates to optical pressure or displacement sensors and relates more specifically to Fabry-Perot pressure or displacement sensors.

In Fabry-Perot pressure sensors for example a pair of partial reflectors or mirrors may be spaced apart by a cavity the dimension of which is varied in dependence upon the pressure applied to one of the mirrors to cause the linear displacement or flexing thereof. In response to such linear displacement of the mirror which will usually be of very small magnitude the light transmitted through and reflected by the mirrors will be varied and this variation can be measured in order to deduce the incident pressure. The Fabry-Perot pressure sensors have such high sensitivity that only minimal linear displacement (e.g. elastic deflection) of one of the mirrors is required to enable the incident pressure to be measured.

The present invention is directed to various improvements in Fabry-Perot optical pressure or displacement sensors which result in:

(1) improved robustness of the sensor;
(2) suitability of the sensor for use in hostile environments; and,
(3) immunity to unwanted reflections from the illumination system of the sensor.

According to one feature of the present invention there is provided a Fabry-Perot pressure or displacement sensor, as described, in which an optical fibre serves to transmit a light beam to the mirrors of the sensor and to receive light which is reflected back from said mirrors, in which said light beam and reflected light comprises light at a plurality of wavelengths, in which the wavelength components of the transmitted light and the wavelength components of the received light are range rated and are compared to provide respective ratios of transmitted intensities and received intensities and in which said ratios are in turn compared to provide a ratio dependent upon the displacement of the mirror due to the pressure applied thereto (or displacement of the mirror due to displacement of a discrete member) but independently of any changes in the intensities of transmitted light due, for example, to reflections etc from optical components in the pressure or displacement monitoring arrangement. Thus the pressure or displacement sensor has immunity to unwanted reflections in the system.

According to another feature of the present invention the mirror assembly of the Fabry-Perot pressure or displacement sensor is safeguarded against the occurrence of excessive pressures or displacements of the mirror in hostile environments that might damage the sensor by providing in the space between the partial reflectors of the sensor a buffer means which has an aperture there through to permit access of incoming light to the partial mirrors but which limits displacement of the displacement mirror beyond a predetermined value.

This buffer means may comprise a vacuum deposited buffer zone of silica or thorium fluoride, for example, preferably attached to the fixed mirror of the sensor.

According to yet another feature of the present invention an optical pressure or displacement sensor is provided, in which the light transmitted to the partial mirror assembly of a Fabry-Perot sensor is conveyed by an optical fibre which also receives the light reflected back from the mirror assembly of the pressure or displacement sensor and in which the transmitted light emerging from the end of the optical fibre is collimated on to the mirror assembly and the reflected light from the assembly is re-focused on to said end of the optical fibre by means of a graded index focusing rod.

By way of example the present invention will now be described with reference to the accompanying drawings in which.

Figure 1:
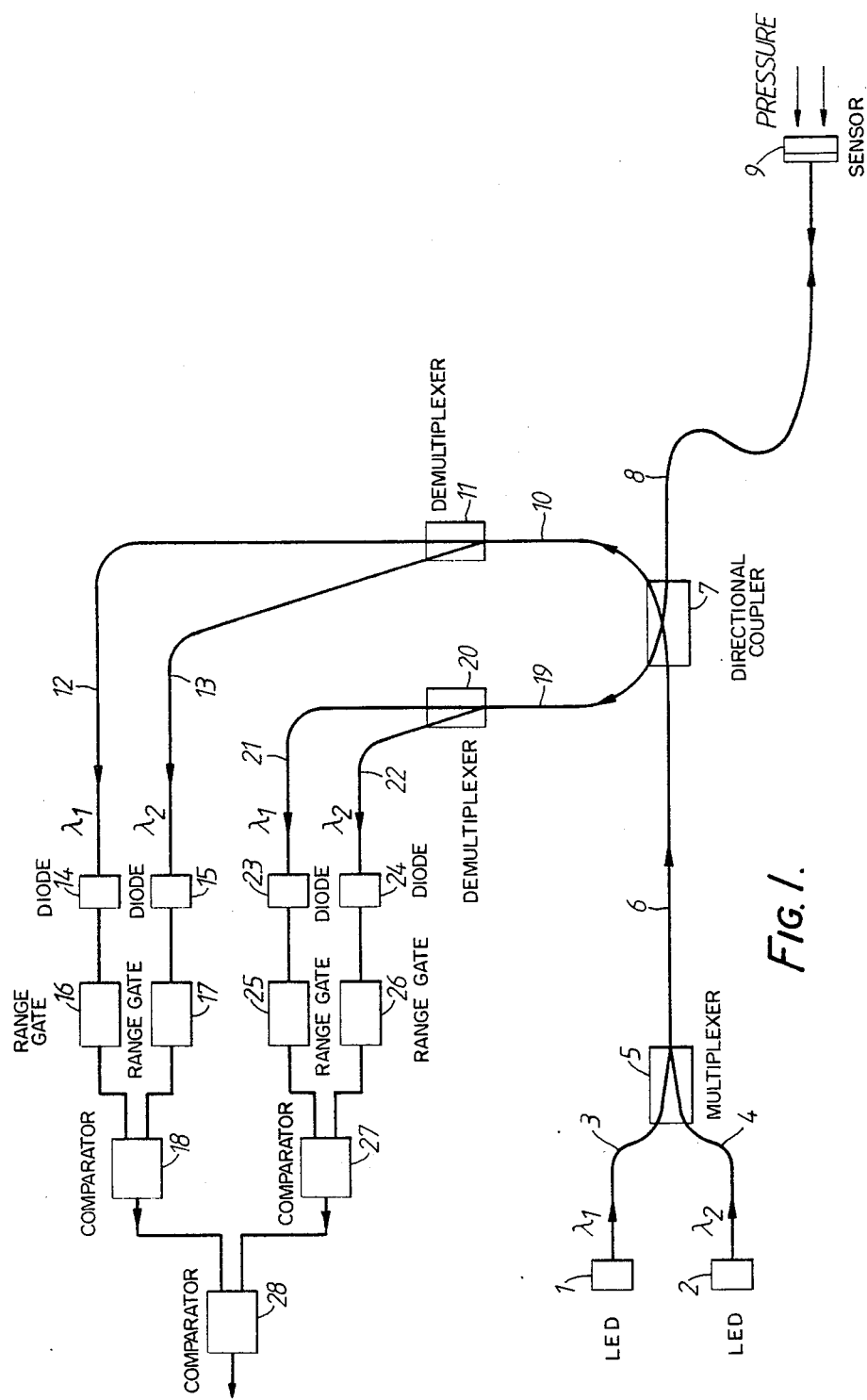
FIG. 1 shows a Fabry-Perot pressure sensor arrangement according to the invention.

Referring to FIG. 1 of the drawings, light at two different wavelengths derived from respective light emitting diodes 1 and 2 for example, may be launched into optical fibres 3 and 4 before being fed into a wavelength multiplexer 5. The multiplexed output from the multiplexer 5 is conveyed by an optical fibre 6 to a directional coupler 7 which splits the light into two equal parts, one of which is conveyed by an optical fibre 8 to a Fabry-Perot two mirror pressure sensor 9 and the other of which is conveyed by an optical fiber 10 to a wavelength de-multiplexer 11. The outputs from the de-multiplexer 11 may be fed by optical fibers 12 and 13 to photo-diodes, such as silicon P.I.N diodes 14 and 15. These diodes provide outputs which are applied, respectively, to range gates 16 and 17 which are switched for short periods for selectively responding to light received from the light sources 1 and 2 via the multiplexer 5, the directional coupler 7 and the multiplexer 11 and the outputs from these gates are fed to a comparator 18 which produces an output indicative of the intensity ratio between the two wavelength signals applied to the Fabry-Perot sensor.

The intensities of the two wavelength light signals reflected back along the optical fibre 8 from the Fabry-Perot pressure sensor 9 will depend upon the spacing between the partial reflectors or mirrors of the sensor 9 which in turn will depend upon the pressure applied to the sensor. These reflected return signals are directed by the directional coupler 7 into an optical fibre 19 and then through a wavelength de-multiplexer 20 which channels the respective wavelength components of the return signals from the sensor 9 into optical fibres 21 and 22 which convey the wavelength component signals to respective photo-diodes, such as silicon P.I.N diodes 23 and 24. These diodes 23 and 24 produce electrical outputs which are applied to range gating devices 25 and 26 which are switched for short periods for selectively responding to light reflected back along the fibre 8 by the sensor 9 via the directional coupler 7 and the de-multiplexer 20, the outputs from which are compared by a comparator 27. This comparator provides an output which is indicative of the ratio between the intensities of return signals at the two different wavelengths.

The output from the comparator 27 and that from the comparator 18 are then fed to a comparator 28 which produces an output which is dependent upon the spacing between the mirrors of the sensor 9 and thus upon the pressure applied to the sensor but which is independent of changes in the intensities of the transmitted light. In this way the pressure sensing arrangement is rendered immune to illumination intensity and reflections from optical components at the pressure monitoring/measuring location.

Figure 2:
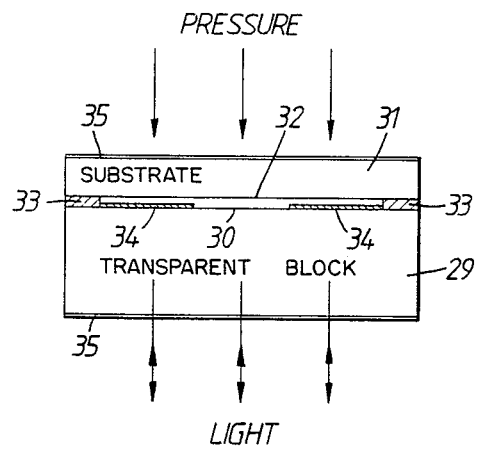
FIG. 2 shows a mirror assembly of a Fabry-Perot pressure sensor.

Referring now to FIG. 2 of the drawings this shows a partial reflector or mirror assembly suitable, for example, for the Fabry-Perot sensor 9 of FIG. 1.

The mirror assembly comprises a transparent block 29 having a partial reflector 30 on one surface thereof and having an anti-reflection coating 35 on its lower surface. A flexible transparent substrate 31 has a partial reflector 32 applied to its under-surface and is spaced from the reflector 30 by means of a spacer member 33 (e.g. silica). When pressure is applied to the top surface of the substrate 31 the dimension of the Fabry-Perot cavity or spacing between the reflectors 30 and 32 will be varied by the flexing of the substrate 31 and this will produce variations in the intensities of the light reflected by the mirror assembly.

In order to prevent damage to the assembly due to excessive pressures acting on the substrate 31, a buffer zone 34 of silica or thorium fluoride, for example, is located in the cavity. This may be provided by vacuum deposition of the silica on to the material of the block 29. As will be appreciated from the drawing, the buffer zone 34 limits deflection of the flexible substrate 31 beyond a certain value and thereby prevents fracturing etc of the flexible substrate. Furthermore, to minimize environmental attack on the flexible substrate 31 the upper surface of the substrate may be suitably coated as shown at 35 in order to give the requisite protection.

Figure 3:
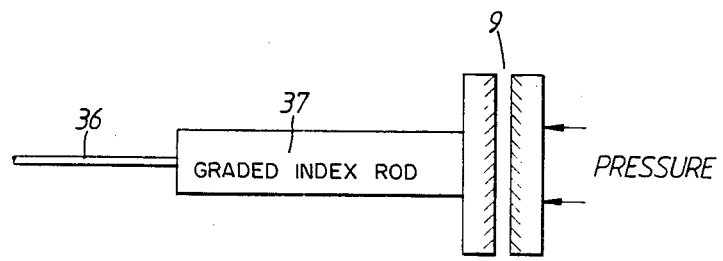
FIG. 3 shows a light collimating and re-focusing arrangement for a Fabry-Perot pressure sensor.

Turning now to FIG. 3 of the drawing, light conveyed to the assembly 35 of the Fabry-Perot sensor 9 through an optical fibre 36 is collimated by means of a graded index rod 37 which also serves to re-focus the light reflected back from the mirror assembly into the optical fibre. The use of the rod lens 37, instead of a convex collimating lens, say, provides both manufacturing and assembly/design advantages.

Although in the embodiment described with reference to the drawings the Fabry-Perot sensor is a pressure sensor it will be understood that the sensor could be utilised for sensing displacement (e.g. linear) of a discrete member mechanically linked to the displacement mirror of the mirror assembly.

We claim:

1. An optical fibre sensor comprising a Fabry-Perot device including a pair of partial reflectors spaced apart by a distance which varies in dependence upon pressure applied to at least one of the reflectors, light source means for producing light at a plurality of wavelengths and optical fibre means for transmitting said light to said reflectors and for receiving light reflected back from said reflectors, in which the wavelength components of the transmitted light and wavelength components of the reflected light are received by range gates switched in accordance with the distance travelled by said wavelength components and are compared by comparator means to provide respective ratios of transmitted intensities and received intensities and in which said ratios are in turn compared by further comparator means to provide a ratio dependent upon the change in spacing between the reflectors but independent of any changes in the intensities of the transmitted light.

2. An optical sensor as claimed in claim 1, in which light source means comprises two light sources for providing respective light signals of different wavelengths which are combined by a multiplexer and then divided into two parts by an optical directional coupler, one part being conveyed by the optical fibre to the reflectors of the Fabry-Perot device and the other part being demultiplexed by a wavelength de-multiplexer the respective outputs from which are fed to photodiodes the electrical outputs from which are in turn fed to range gates which provide outputs compared by a first comparator which produces an output indicative of the intensity ratio between the two wavelength signals applied to the Fabry-Perot sensor, and in which the light signals of different wavelengths reflected back along the optical fibre from the reflectors of the Fabry-Perot device are directed by the directional coupler into a further wavelength de-multiplexer the respective outputs from which are fed to photo-diodes the electrical outputs from which are in turn fed to range gates which provide outputs compared by a second comparator which produces an output indicative of the intensity ratio between the intensities of the reflected signals at the two different wavelengths, and in which the outputs from the first and second comparators are fed to a third comparator which produces an output dependent upon the spacing of the reflectors of the Fabry-Perot device and the pressure applied to the sensor but which is independent of changes in the intensities of the light transmitted to the sensor device.

3. An optical pressure or displacement sensor as claimed in claim 1 or claim 2, in which buffer means is provided in a space between the partial reflectors of the Fabry-Perot device in order to safeguard the device against the occurrence of an excessive parameter being sensed, in which the buffer means has an aperture therethrough to permit access of incoming light to the partial reflectors but which limits displacement of the displacement reflector beyond a predetermined value.

4. An optical pressure of displacement sensor as claimed in claim 3, in which the Fabry-Perot device comprises a transparent block having a partial reflector on one surface thereof and an anti-reflector coating on its opposite surface, a flexible transparent substrate having a partial reflector on one surface thereof which is spaced from the transparent block by a spacer member to leave a cavity the dimensions of which will be varied in response to flexure of the substrate, in which the buffer means comprises a deposited zone of silicon on the transparent block.

5. An optical pressure or displacement sensor as claimed in claim 1 or 2, in which the light conveyed to the Fabry-Perot device through the optical fibre is collimated by means of a graded index rod which also serves to re-focus the light reflected back from the partial reflectors into the optical fibre.

* * * * *